Jan. 2, 1951  H. KATZ  2,536,552
PIPE ADAPTING DEVICE
Filed Aug. 30, 1946
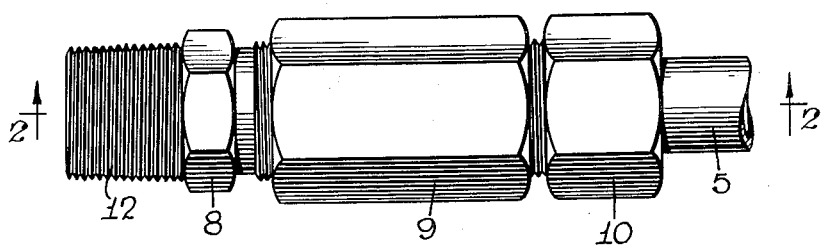
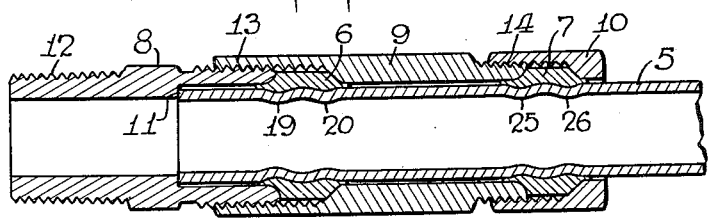
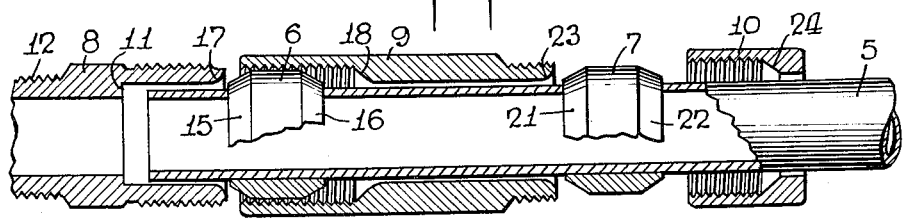
INVENTOR
*Harry Katz*
BY *George H. Mitchell*
ATTORNEY Patented Jan. 2, 1951

2,536,552

UNITED STATES PATENT OFFICE 2,536,552

PIPE ADAPTING DEVICE

Harry Katz, Brooklyn, N. Y.

Application August 30, 1946, Serial No. 693,999

3 Claims. (Cl. 285—122)

My invention relates to pipe-coupling arrangements and in particular to adapter fittings for coupling the end of a length of pipe to a valve, tank, or other terminal structure, or to another length of pipe.

It is an object of the invention to provide an improved adapter fitting for a pipe.

It is another object to provide an improved adapter fitting having features of simplicity, efficiency, ruggedness, and low cost.

It is a further object to provide an improved adapter fitting requiring a minimum of maintenance and upkeep even under severe operating conditions, particularly in the presence of sustained vibrations.

Other objects and various further features of the invention will hereinafter be pointed out or will occur to those skilled in the art from a reading of the following specification in conjunction with the accompanying drawings. In said drawings:

Fig. 1 is a side elevational view of an adapter-fitting according to the invention, shown fitted to a pipe;

Fig. 2 is a sectional view taken substantially in the plane 2—2 of Fig. 1; and

Fig. 3 is a partially broken-away sectional view of elements of the adapter of Fig. 1, shown axially separated just prior to final assembly into locked relation.

Broadly speaking, my invention contemplates an adapter fitting having two deformable sleeves or thimbles, intermediate abutment means between said sleeves, and end abutment means outside each of the sleeves—all these parts being generally coaxially arranged external to a pipe. Threaded means cooperating between the end abutment means serve for the application of axially compressional forces between the abutment members and the sleeves, and cooperating camming surfaces on the abutment members and on the sleeves serve to deform the sleeves radially inward under the action of the axially compressional forces. In the specific form to be described, the sleeves or thimbles are each provided with radially inwardly sloping surfaces at the axial extremities, whereby these extremities are readily deformable. Also, the end abutment members and the intermediate abutment member threadedly engage each other, as in union fitting, to provide substantially independent applications of axially compressional forces on each of the sleeves or thimbles.

Referring to the drawings, my invention is shown in application to an adapter fitting for joining a pipe or tube 5 to a valve, tank, or other terminal structure (not shown). Binding and sealing engagement of the adapter to the pipe is effected over essentially two circumferentially continuous areas by the action of circumferentially continuous deformable sleeves or thimbles 6—7 at each of these areas. In the form shown, deforming action is applied to each of these thimbles by three cooperating abutment members comprising a first end abutment in the form of a coupling 8, an intermediate abutment member or belled nipple 9, and a second end abutment member or union nut 10. Since, in the form shown, the pipe 5 is to be adapted to a terminal structure, the end abutment member or coupling 8 may include an internal shoulder 11 abuttingly to receive the end of pipe 5. A conventional external thread 12 on the coupling 8 permits a ready fitting of this member 8 to conventional plumbing parts and fixtures, as will be clear.

It has been indicated that the radially inward deformation of portions of the thimbles 6 and 7 is accomplished by the cooperation of abutment members 8, 9 and 10. In the form shown, this cooperation is by means of threaded means 13—14 on each of these abutment members for the application of axially compressional forces on the thimbles 6 and 7. These axially compressional forces may be transformed into radially inwardly compressional or deforming forces by providing suitable cooperating camming surfaces on the thimbles and on the abutment members 8, 9, and 10.

In the form shown, each of the thimbles 6—7 is provided at its outer edge with inwardly sloping surfaces, such as surfaces 15 and 16 on thimble 6. To cooperate with the surfaces 15 and 16, coupling 8 may have an outwardly flaring surface 17, and the intermediate member 9 may have a similar outwardly flaring surface 18 within its bell end. It will be appreciated that the inwardly tapering ends of thimble 6 provide a structure that is relatively weak and hence deformable at these ends. Thus, under the action of the threaded engagement 12, radially inward deformation of thimble 6 may serve to seal off and to bind members 6, 8, and 9 to the pipe. In practice, it has been found that for a thimble of the type shown, two circumferentially continuous ridges 19—20 may be formed in the pipe 5 during and as a result of the deformation of a single thimble, such as thimble 6. The circumferentially continuous nature of this contact not only makes for a uniform and secure binding action but also clearly provides an effective seal against possible leakage from the pipe 5.

Thimble 7 may, like thimble 6, be provided with inwardly sloping outer edges 21—22 to coact with outwardly flaring camming surfaces 23—24 on the intermediate member 9 and on the end member or union nut 10, respectively. Here, again, it will be understood that compressional forces resulting from advancement of the threaded engagement 14 may serve so to deform the thimble 7 as to cause two more circumferentially extending ridges 25—26 in the pipe 5. The increased security and sealing qualities of my improved fitting are believed attributable to the fact that, once each of the thimbles 6 and 7 has been caused to bind independently against the pipe 5, further compressional advancement of the threaded engagements 13 and 14 results in a lock-nut action which might be viewed as being applied in tension between coupling 8 and union nut 10 via the intermediate member 9, and in compression between coupling 8 and union nut 10 via thimbles 6 and 7 and via the length of pipe between these thimbles.

It will be seen that I have provided an improved pipe-adapter fitting having features of simplicity and of efficiency. The lock-nut action which has been described is believed responsible for the relatively little maintenance required of my fittings (as compared with conventional fittings) even when installed in heavy, vibrating machinery, such as truck and bus engines. As clearly shown in the drawing, the members 8—9—10 may have minimum internal diameters definitely in excess of the external pipe diameter, while the internal diameter of the thimbles need only be slightly greater than the pipe diameter—thereby permitting self-aligning or self-centering action of all adapter parts more or less independently of slight irregularities or curvatures of the pipe. With self-alignment of parts, the lock-nut action may be equally effective if the pipe 5 is perfectly straight or if it may be curved.

While I have described my invention in detail for the preferred form shown, it will be understood that modificatoins may be made within the scope of the invention as defined in the following claims.

I claim:

1. In an adapter fitting for relatively thin-walled conduits, an intermediate member, first and second end members threadedly engageable with opposite ends of said intermediate member, spaced first and second deformable thimbles for engagement between said intermediate member and said first and second end members respectively, all of the engaging surfaces of said members and said thimbles being provided with longitudinally inwardly directed cam faces whereby when the end members are first drawn toward the intermediate member said thimbles are longitudinally displaced and inwardly deformed to engage a conduit and when either of the end members is further drawn toward the intermediate member longitudinal compressive force is applied to the portion of a conduit engaged between said thimbles.

2. An adapter fitting as claimed in claim 1, wherein said first end member is recessed to receive an end of a conduit, said recess being provided with an abutment to limit longitudinal movement of a conduit when inserted into the fitting.

3. In an adapter fitting for relatively thin-walled conduits, an intermediate member, gripping means at one end of the intermediate member for radially deformable engagement with a conduit, an end member threadedly engageable with the other end of the intermediate member spaced from the gripping means, a deformable thimble to be received between said end member and the intermediate member, all of the engaging surfaces of said end member, thimble, and other end of the intermediate member being provided with longitudinally inwardly directed cam faces whereby when said end member is first drawn toward the intermediate member said thimble is longitudinally displaced and inwardly deformed to engage a conduit and when said end member is further drawn toward the intermediate member longitudinal compressive force is applied to the portion of a conduit engaged between said thimble and said gripping means.

HARRY KATZ.

REFERENCES CITED

The following references are of record in the file of this patent:

UNITED STATES PATENTS

| Number | Name | Date |
| --- | --- | --- |
| 1,251,464 | Becker | Jan. 1, 1918 |
| 2,188,006 | Katcher | Jan. 23, 1940 |